United States Patent
Frohnapfel et al.

(10) Patent No.: US 12,535,312 B2
(45) Date of Patent: Jan. 27, 2026

(54) WHITE LIGHT INTERFEROMETER FOR MEASURING RADIAL GROWTH IN COMPONENTS EXPERIENCING ROTATING STRESSES

(71) Applicant: RTX Corporation, Farmington, CT (US)

(72) Inventors: Dustin Frohnapfel, Hebron, CT (US); Daniel W. Shannon, Glastonbury, CT (US); Robert H. Dold, Monson, MA (US); Christopher T. Chipman, Brooklyn, CT (US); Guthrie G. Bagdonis, Marlborough, CT (US); John D. Cannata, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 36 days.

(21) Appl. No.: 18/680,816

(22) Filed: May 31, 2024

(65) Prior Publication Data

US 2025/0369751 A1 Dec. 4, 2025

(51) Int. Cl.
*G01B 11/14* (2006.01)
*F01D 21/00* (2006.01)

(52) U.S. Cl.
CPC .......... *G01B 11/14* (2013.01); *F01D 21/003* (2013.01); *F05D 2260/83* (2013.01); *F05D 2270/804* (2013.01)

(58) Field of Classification Search
CPC ..... G01B 11/2441; G01B 11/24; G01B 11/30; G01B 11/0675; G01B 11/14;

(Continued)

(56) References Cited

U.S. PATENT DOCUMENTS 4,326,804 A * 4/1982 Mossey ................. G01B 11/14
250/559.38
4,606,639 A * 8/1986 Mottier .............. G01B 11/2416
356/497

(Continued)

FOREIGN PATENT DOCUMENTS

CN 119043200 A 11/2024
EP 3631355 B1 12/2020

OTHER PUBLICATIONS

European Search Report dated Oct. 27, 2025, in connection with European Application No. 25180014.0, 10 pages.

(Continued)

*Primary Examiner* — Gordon J Stock, Jr.

(57) ABSTRACT

An apparatus measures clearances between a rotating structure within a fixed surrounding structure. A position detector determines when at least one portion of the rotating structure rotates past a hole defined in the fixed surrounding structure and generates an actuation signal responsive to rotation of the at least one portion of the rotating structure past the hole defined in the fixed surrounding structure. White light interferometer circuitry reflects a white light beam off of at least one portion of the rotating structure responsive to the actuation signal to determine a clearance between the at least one portion of the rotating structure and an inner surface of the fixed structure. The actuation signal actuates the white light interferometer circuitry to reflect the white light beam off of the at least one portion of the rotating structure through the hole defined in the fixed surrounding structure.

20 Claims, 3 Drawing Sheets

(58) Field of Classification Search
CPC ..... G01B 11/026; G01B 11/161; G01B 11/00; G01B 9/0209; G01B 9/02; G01B 9/02029; G01B 9/0203; G01M 11/08; G01M 11/081; G01M 5/0016; G01M 5/0091; F01D 11/20; F01D 17/02; F01D 21/003; F05D 2240/307; F05D 2260/83; F05D 2270/804; F05D 2270/8041; F05D 2270/821

See application file for complete search history.

(56) References Cited

U.S. PATENT DOCUMENTS

| | | | | |
|---|---|---|---|---|
| 5,017,796 | A * | 5/1991 | Makita | G01B 11/14 356/624 |
| 7,388,680 | B2 * | 6/2008 | Heyworth | G01B 11/14 356/625 |
| 7,400,418 | B2 * | 7/2008 | Haffner | G01B 11/14 356/497 |
| 7,502,128 | B2 * | 3/2009 | Heyworth | G01N 21/8806 356/614 |
| 7,656,445 | B2 | 2/2010 | Heyworth | |
| 8,654,315 | B2 * | 2/2014 | Kominsky | F01D 21/003 356/5.1 |
| 9,512,736 | B2 * | 12/2016 | Gendrich | F01D 17/02 |
| 9,719,774 | B2 | 8/2017 | Ullrich et al. | |
| 10,488,182 | B2 * | 11/2019 | Onishi | G01B 11/14 |
| 10,663,280 | B2 * | 5/2020 | Lipstein | G01B 5/242 |
| 11,156,455 | B2 * | 10/2021 | Thimmegowda | G01B 15/00 |
| 11,409,022 | B2 * | 8/2022 | Schleif | F01D 11/08 |
| 12,060,865 | B2 * | 8/2024 | Boyd | F01D 11/14 |
| 2020/0182609 | A1 * | 6/2020 | Fukuyama | F01D 11/20 |
| 2022/0090582 | A1 | 3/2022 | Boyd et al. | |

OTHER PUBLICATIONS

Bentley Nevada, "TK84 Temporary Transducer Interface User Guide," Artisan Technology Group, 1988, 19 pages.
Gunther, et al., "Measurement of radial expansion and tumbling motion of a high-speed rotor using an optical sensor system," Mechanical Systems and Sign Processing, vol. 25, No. 1, Aug. 2011, 12 pages.
Kempe, et al., "Spatial and Temporal High-Resolution Optical Tip-Clearance Probe for Harsh Environments", 13th International Symposium Applications of Laser Techniques to Fluid Mechanics, #1155, Lisbon, Portugal, Jun. 2006, 8 pages.
Paschotta, "White Light Interferometers," RP Photonics Encyclopedia, Jun. 2005, 5 pages.
Pfister, et al., "Turbo machine tip clearance and vibration measurements using a fibre optic laser Doppler position sensor," Mesurement Science and Technology, vol. 17, No. 7, Jun. 2006, 13 pages.
Vakhtin, et al., "Optical Probe for Monitoring Blade Tip Clearance," 47th AIAA Aerospace Sciences Meeting Including The New Horizons Forum and Aerospace Exposition, AIAA 2009-507, Orlando, Florida, Jan. 2009, 9 pages.

* cited by examiner

WHITE LIGHT INTERFEROMETER FOR MEASURING RADIAL GROWTH IN COMPONENTS EXPERIENCING ROTATING STRESSES

TECHNICAL FIELD

This disclosure relates generally to rotating components clearance with respect to a fixed surrounding structure. More specifically, this disclosure relates to the use of white light interferometry to measuring radial growth for rotating components within a fixed surrounding structure.

BACKGROUND

Rotating components commonly experience aeromechanical stresses that cause radial growth. When constrained by an end wall, the radial growth of the rotating component can reduce the clearance gap between the rotating component and the nonrotating end wall. In nonmetallic components, it is often impossible to measure this clearance gap during operation as conventional measurement instrumentations rely on electric field or magnetic field variations with metallic component interactions. Thus, there is a need for a system and method for measuring clearance gaps between rotating and nonrotating components when the rotating component comprises a nonmetallic structure.

SUMMARY

This disclosure relates to controlling operation of a turbine engine responsive to control outputs of the auto-throttle.

One aspect thereof comprises an apparatus for measuring clearances between a rotating structure within a fixed surrounding structure. A position detector determines when at least one portion of the rotating structure rotates past a hole defined in the fixed surrounding structure and generates an actuation signal responsive to rotation of the at least one portion of the rotating structure past the hole defined in the fixed surrounding structure. A white light interferometer circuitry reflects a white light beam off of at least one portion of the rotating structure responsive to the actuation signal to determine a clearance between the at least one portion of the rotating structure and an inner surface of the fixed structure. The actuation signal actuates the white light interferometer circuitry to reflect the white light beam off of the at least one portion of the rotating structure through the hole defined in the fixed surrounding structure.

The above-described aspect of the apparatus may further comprise a processor for determining changes in the clearance between the at least one portion of the rotating structure and the fixed surrounding structure responsive to the clearance determined by the white light interferometer circuitry and a clearance determined when the rotating structure is not moving.

The above-described aspect of the apparatus, wherein the position detector further comprises a reflector mounted on the rotating structure. A laser projects a laser beam toward the rotating structure in a fixed position. A detector detects a reflection of the laser beam from the reflector when the reflector reflects the laser beam responsive to rotation of the reflector past the fixed position of the laser beam. A controller determines when the at least one portion of the rotating structure rotates past the hole defined in the fixed surrounding structure responsive to the detected reflection of the laser beam and generates the actuation signal responsive to the determination.

The above-described aspect of the apparatus, wherein the white light interferometer circuitry further comprises a white light emitter for generating a white light beam responsive to the actuation signal from the position detector. A beam splitter receives the white light beam and generates a reference beam and a measurement beam responsive thereto. A high-speed camera compares the reference beam and the measurement beam to determine the clearance between the at least one portion of the rotating structure and the inner surface of the fixed surrounding structure. The reference beam is reflected by the beam splitter to the high-speed camera and the measurement beam is reflected by the beam splitter to the hole in the fixed surrounding structure and the at least one portion of the rotating structure reflects the measurement beam back to the beam splitter which reflects the measurement beam to the high-speed camera.

The above-described aspect of the apparatus, wherein the white light beam is projected perpendicular to an axis of rotation of the rotating structure.

The above-described aspect of the apparatus, wherein the white light beam is projected parallel to an axis of rotation of the rotating structure.

The above-described aspect of the apparatus, wherein the rotating structure comprises a fan and further wherein the at least one portion of the rotating structure comprises a blade time of a fan blade of the fan.

In another aspect thereof the system an apparatus comprises a fan having a plurality of blades made of a nonmetallic structure rotating about a rotation axis of the fan. A fixed structure surrounds the fan and has an inner surface separated from the blades by a clearance. A position detector determines when at a tip of a blade of the fan rotates past a hole defined in the fixed structure and generates an actuation signal responsive to rotation of the tip of the blade of the fan past the hole defined in the fixed structure. A white light interferometer circuitry reflects a white light beam off of the tip of the blade of the fan responsive to the actuation signal to determine the clearance between the tip of the blade of the fan and the inner surface of the fixed structure. The actuation signal actuates the white light interferometer circuitry to reflect the white light beam off of the tip of the blade of the fan through the hole defined in the fixed structure.

The above-described aspect of the apparatus may further comprise a processor for determining changes in the clearance between the tip of the blade of the fan and the fixed structure responsive to the clearance determined by the white light interferometer circuitry and a clearance determined when the fan is not moving.

The above-described aspect of the apparatus, wherein the position detector further comprises a reflector mounted on the fan. A laser projects a laser beam toward the fan in a fixed position. A detector detects a reflection of the laser beam from the reflector when the reflector reflects the laser beam responsive to rotation of the reflector past the fixed position of the laser beam. A controller for determining when the tip of the blade of the fan rotates past the hole defined in the fixed surrounding structure responsive to the detected reflection of the laser beam and generating the actuation signal responsive to the determination.

The above-described aspect of the apparatus, wherein the white light interferometer circuitry further comprises a white light emitter for generating a white light beam responsive to the actuation signal from the position detector. A beam splitter receives the white light beam and generates a reference beam and a measurement beam responsive thereto. A high-speed camera compares the reference beam and the measurement beam to determine the clearance between the tip of the blade of the fan and the inner surface of the fixed structure. The reference beam is reflected by the beam splitter to the high-speed camera and the measurement beam is reflected by the beam splitter to the hole in the fixed structure and the tip of the blade of the fan reflects the measurement beam back to the beam splitter which reflects the measurement beam to the high-speed camera.

The above-described aspect of the apparatus, wherein the white light beam is projected perpendicular to an axis of rotation of the fan.

The above-described aspect of the apparatus, wherein the white light beam is projected parallel to an axis of rotation of the fan.

In another aspect thereof a method for measuring clearances between a rotating structure within a fixed surrounding structure comprises determining when at least one portion of the rotating structure rotates past a hole defined in the fixed surrounding structure using a position detector, generating an actuation signal responsive to rotation of the at least one portion of the rotating structure past the hole defined in the fixed surrounding structure using the position detector, reflecting a white light beam off of at least one portion of the rotating structure through the hole defined in the fixed surrounding structure using white light interferometer circuitry responsive to the actuation signal and determining a clearance between the at least one portion of the rotating structure and an inner surface of the fixed surrounding structure using the white light interferometer circuitry.

The above-described aspect of the method may further comprise determining changes in the clearance between the at least one portion of the rotating structure and the fixed surrounding structure responsive to the clearance determined by the white light interferometer circuitry and a clearance determined when the rotating structure is not moving using a processor.

The above-described aspect of the method, wherein the step of determining further comprises projecting a laser beam from a laser toward the rotating structure in a fixed position, reflecting the laser beam back using a reflector mounted on the rotating structure, detecting using a detector a reflection of the laser beam from the reflector when the reflector reflects the laser beam responsive to rotation of the reflector past the fixed position of the laser beam and determining using a controller when the at least one portion of the rotating structure rotates past the hole defined in the fixed surrounding structure responsive to the detected reflection of the laser beam.

The above-described aspect of the method, wherein the step of generating further comprises generating the actuation signal responsive to the determination.

The above-described aspect of the method, wherein the step of reflecting further comprises generating a white light beam using a white light emitter responsive to the actuation signal from the position detector, receiving the white light beam at a beam splitter and generating a reference beam and a measurement beam responsive to the received white light beam.

The above-described aspect of the method, wherein the step of determining the clearance further comprises comparing using a high-speed camera the reference beam and the measurement beam to determine the clearance between the at least one portion of the rotating structure and the inner surface of the fixed surrounding structure.

The above-described aspect of the method, wherein the step of generating the reference beam and the measurement beam further comprises splitting the white light beam into the reference beam and the measurement beam at the beam splitter, reflecting the reference beam by the beam splitter to a high-speed camera, reflecting the measurement beam to the hole in the fixed surrounding structure, reflecting the measurement beam from the at least one portion of the rotating structure back to the beam splitter and reflecting the measurement beam to the high-speed camera.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
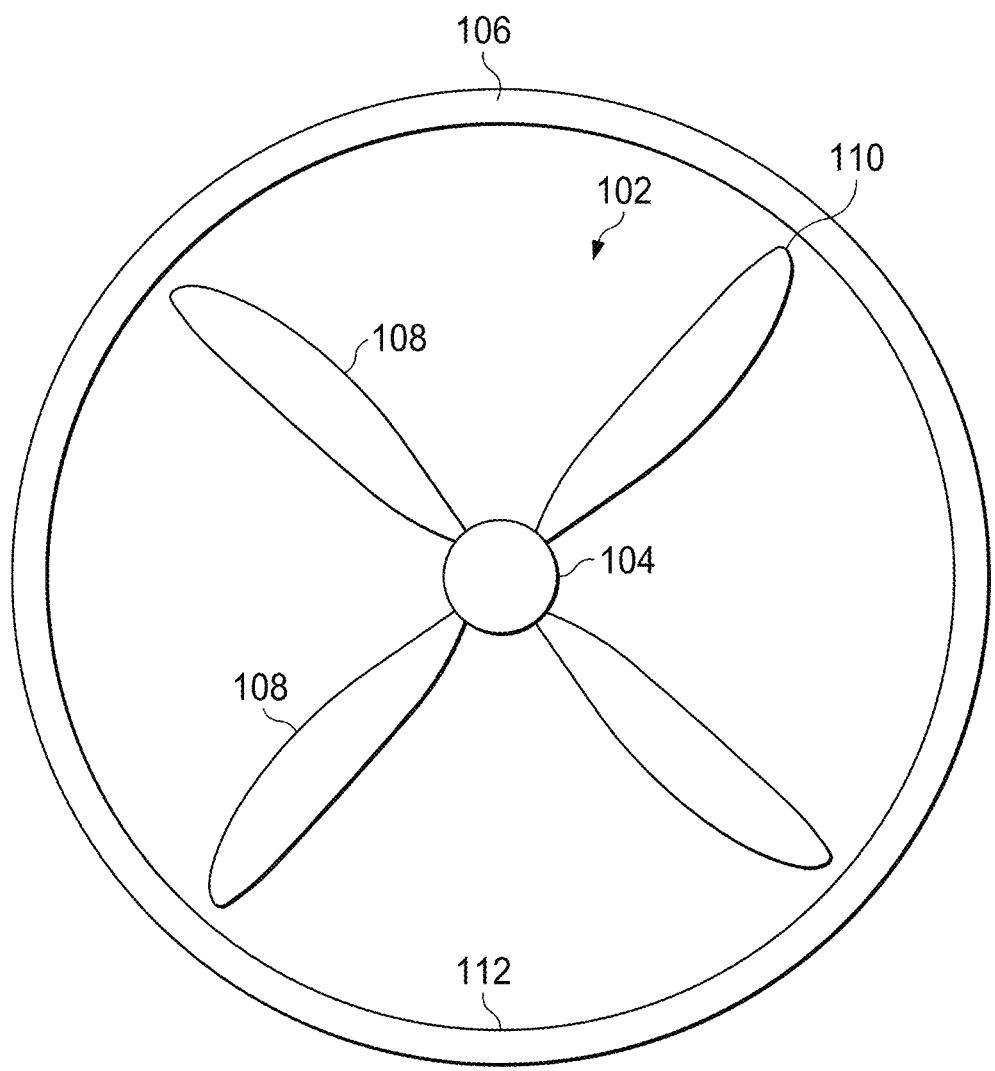
FIG. 1 illustrates a fan rotating within a fixed structure.

Referring now to FIG. 1, there is illustrated a rotating member comprising a fan 102 that rotates about a central axis 104. Surrounding the fan 102 is a fixed housing 106 that comprises a cowling or support frame for the fan 102. Rotational stresses of the fan 102 can cause the fan blades 108 to have radial growth outward from the central axis 104. This radial growth can become problematic if the radial growth of the fan blade 108 exceeds the clearance between the fan blade tip 110 and the inner surface 112 of the fixed structure 106. If the radial growth of the fan blade 108 exceeds the clearance, the fan blade will strike the inner surface 112 of the surrounding structure 106 causing damage to both.

As previously mentioned, existing measurement systems and methods utilize electric and magnetic field variations in order to detect movements of the blade tip 110 within the fan 102. However, these type of measurement systems and methods are only useful when metal fan blades are utilized. For nonmetallic fan blades 108 electric and magnetic fields would not work with the existing technologies.

Figure 2:
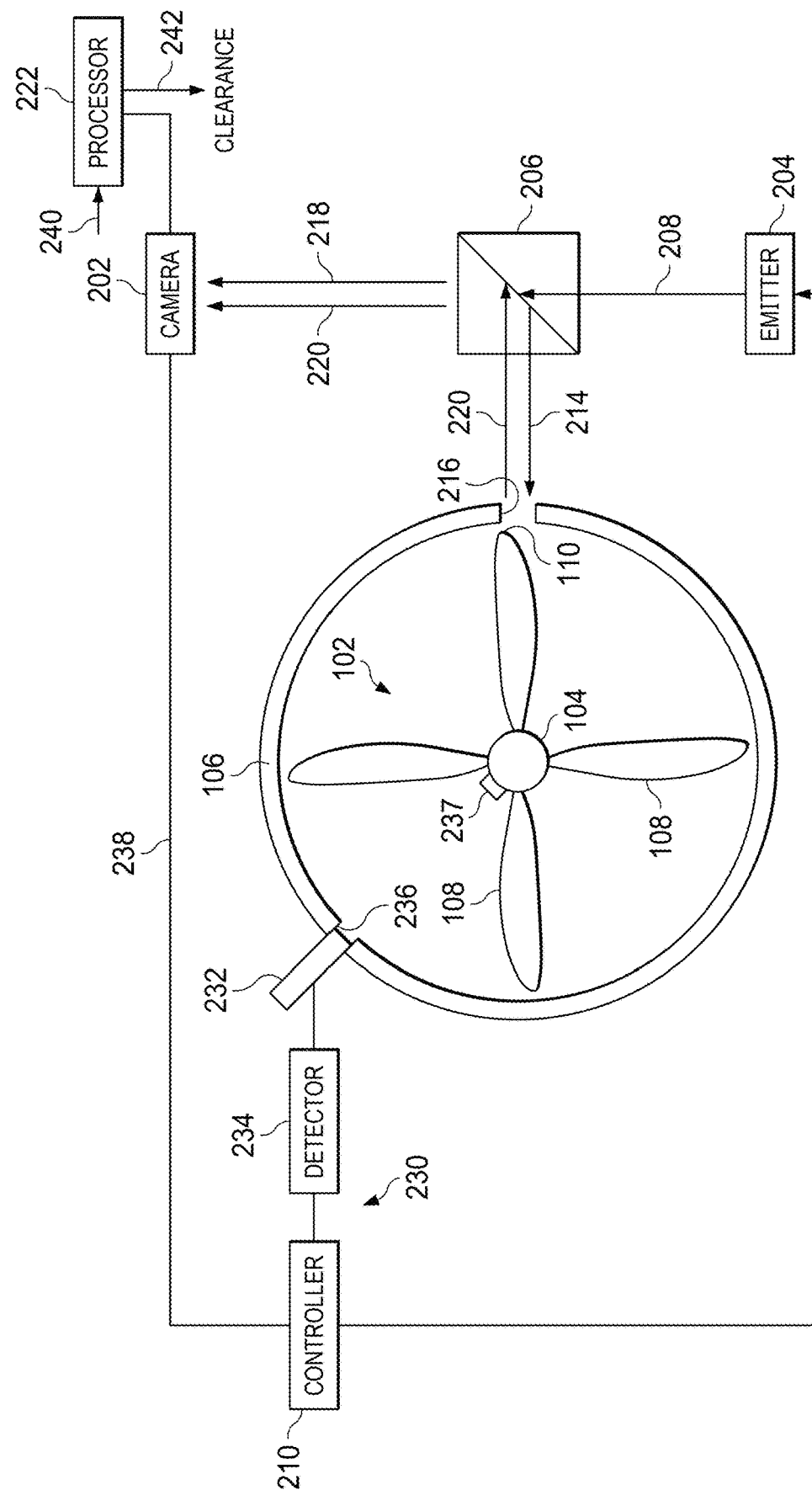
FIG. 2 illustrates a fan operating within a fixed structure and the apparatus for measuring rotational clearance using white light interferometry.

Referring now to FIG. 2, there is illustrated a system for measuring the clearance of a fan blade 108 from the inner surface 112 of a surrounding structure 106 using white light interferometry. The illustrated system utilizes white light interferometry with high-speed image capture to measure changes in geometry of components experiencing rotating stresses. As the component rotates at high speed, radial growth can be observed by a high-speed camera 202. Comparisons to nonrotating measurements may then be made to indicate the magnitude of radial growth as more fully described hereinbelow.

The white light interferometry measurement system consist of the high-speed camera 202, a white light emitter 204 and a beam splitter 206. The white light emitter 204 emits a white light beam 208 responsive to a control signal received from a controller 210 via control line 212. The white light emitter 204 provides a broadband "white light" source is used to illuminate the fan blade tips 110. Emitted light beam 208 enters a beam splitter 206 that splits the light beam into a first measurement beam 214 reflected toward a hole 216 within the fixed structure 106 surrounding the rotating fan 102. A second reference beam 218 is reflected toward the high-speed camera 202. The beam 214 reflected toward the hole 216 interacts with the blade tip 110 of a fan blade 108 and reflects a beam 220 back toward the beam splitter 206. The reflected beam 220 is reflected toward the high-speed camera 202. High-speed camera 202 provides the imagery captured with respect to beam 218 and 220 to a processor 222. High-speed camera 202 is initiated to take pictures of the reflected white light by the controller 210. The high-speed camera 202 is placed at the point where the two images of the reference beam 218 and the reflected beam 220 are superimposed. The reference beam 218 is reflected by the beam splitter 206 to the high-speed camera 202 as beam 218, while the measurement beam is reflected from the blade tip 110 as beam 220. The returning beams are relayed by the beam splitter 206 to the high-speed camera 202 and form an interference pattern of the test surface topography that is spatially sampled by the individual high speed camera pixels.

Interferometry makes use of the wave superposition principle to combine waves in a way that will cause the result of their combination to extract information from those instantaneous wave fronts. This works because when two waves combine, the resulting pattern is determined by the phase difference between the two waves. Waves that are in-phase will undergo constructive interference while waves that are out of phase will undergo destructive interference.

Due to the rotating nature of the fan blades 108, it is necessary to control the operation of both the emitter 204 and high-speed camera 202 such that the emitter and camera are both actuated responsive to the blade tip 110 of each of the blades 108 passing by the hole 216 within the fixed structure 106. Blade rotation detection circuitry 230 consist of a laser 232, a detector 234, a reflector 236 and a controller 210. The detector circuit 234 generates control signals to activate a laser 232 located to shoot a beam through a second hole 237 within the fixed structure 106. The laser 232 generates a beam that is reflected from a reflector 236 located on the rotating central axis 104 of the fan 102. The generated laser beam is reflected from the reflector 236 back to the detector 234 associated with the laser 232 to detect passage of the reflector 236. Detection of the reflector 236 reflecting the laser beam back to the detector 234 is provided to the controller 210. Utilizing this information, the controller 210 determines the rotational velocity of the fan 102 and generate control signals to the emitter 204 via control line 212 and to the high-speed camera 202 via a control line 238.

The high-speed camera 232 provides the detected reference beam 218 and reflected beam 220 information to the processor 222 to enable a determination of the clearance between the blade tip 110 and the inner surface 112 of the fixed structure 106. This information when combined with clearance information provided via input 240 enables the processor 222 to determine the current clearance between the various blade tips 110 and the inner surface 112 of the fixed structure 106. This information may be output the output 242 as the clearance information.

Figure 3:
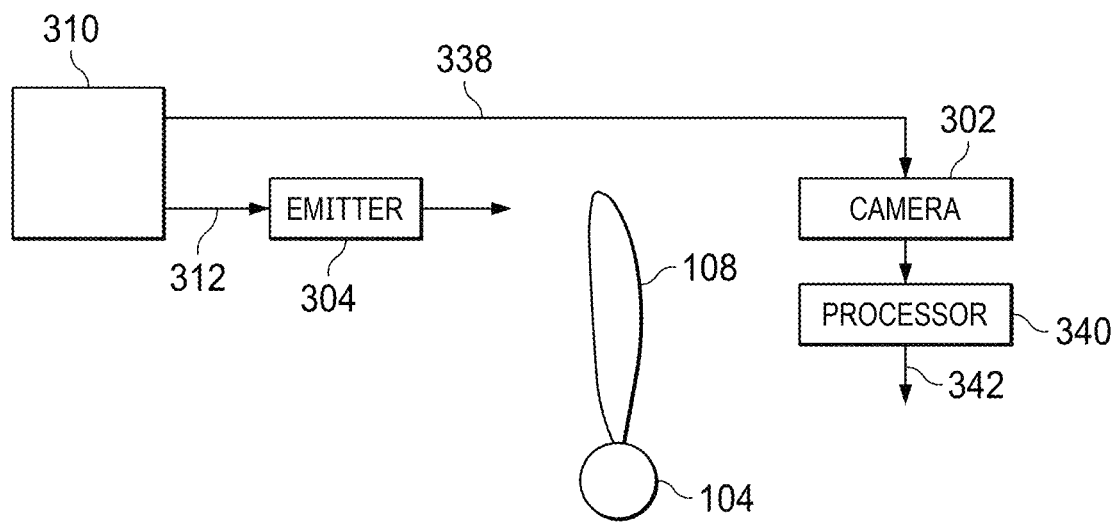
FIG. 3 illustrates an alternative embodiment of a fan operating within a fixed structure and the apparatus for measuring rotational clearance using white light interferometry.

Referring now to FIG. 3, rather than detecting the clearance of the blade perpendicularly to the axis of rotation of the fan 102 as the blade tips rotate past a hole in the fixed structure 106, the passage of the blade tip between the white light emitter 204 and the high-speed camera 202 may be detected as more particularly illustrated in FIG. 3. In this case, the emitter 304 projects the beam 308 along the axis of rotation of the fan 102. Each time the blade 108 passes through the beam 208 this is detected as a shadow by the high-speed camera 202. This may be used to calculate a clearance of the blade tip 110 in a manner similar to that discussed with respect to FIG. 2.

The white light interferometry measurement system of FIG. 3 consist of the high-speed camera 302 and a white light emitter 304. The white light emitter 304 emits a white light beam 308 responsive to a control signal received from a controller 310 via control line 312. The white light emitter 304 provides a broadband "white light" source is used to illuminate the fan blade tips 110. Emitted light beam 308 is interrupted by a blade 108 passing therethrough within the fixed structure 106 surrounding the rotating fan 302. A beam 318 is reflected toward the high-speed camera 302. High-speed camera 302 provides the imagery captured with respect to beam 318 to a processor 322. High-speed camera 302 is initiated to take pictures of the reflected white light by the controller 310.

The high-speed camera 232 provides the beam 218 information to the processor 222 to enable a determination of the clearance between the blade tip 110 and the inner surface 112 of the fixed structure 106. This information when combined with clearance information provided via input 340 enables the processor 322 to determine the current clearance between the various blade tips 110 and the inner surface 112 of the fixed structure 106. This information may then be output the output 342 as the clearance information.

Figure 4:
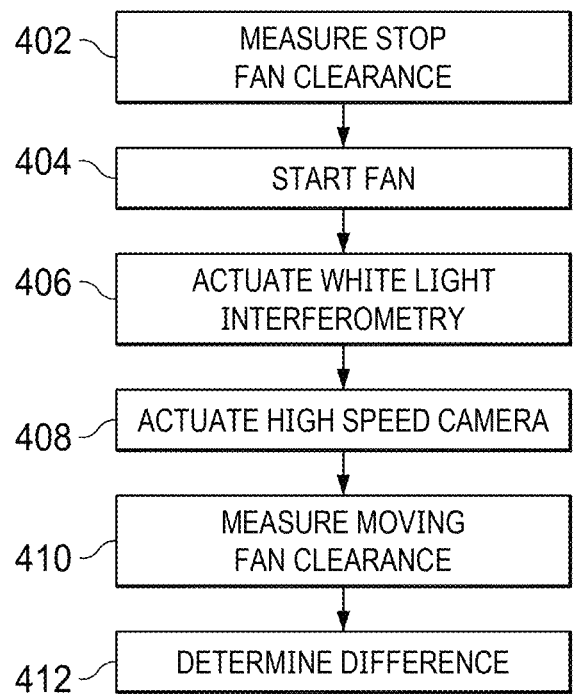
FIG. 4 illustrates a flow diagram of the manner for determining a clearance between a rotating fan and fixed surrounding structure.

Referring now to FIG. 4, there is illustrated a flow diagram of the process for detecting blade tip clearance utilizing the embodiment of FIG. 2. Initially, measurements are made to determine the clearance between the blade tips 110 and the inner surface 112 of the fixed structure 106 when the fan is in a stopped position at step 402. Operation of the fan is initiated at step 404 to begin its rotation. Responsive to the detected position of the fan blade tips 110 utilizing the position detection circuitry 230, the white light interferometer is actuated at step 406 and the high-speed camera is actuated at step 408 to detect clearances of the blade tip 110 as it passes by opening 216. Utilizing the information obtained from the white light interferometer, the clearance of the moving fan is measured and determined at step 410. Finally, based upon a comparison of the stationary fan clearance obtained from step 402 and the moving fan clearance obtained at step 410, the difference between the two clearances may be determined at step 412. This will enable a determination of the effect of rotation stresses that may cause radial growth during fan operation.

While the above description has been made with respect to a rotating fan structure, it will be appreciated by one skilled in the art that any type of rotating structure could utilize similar techniques and methods for measuring clearance between a rotating structure and a fixed structure in a similar fashion. Additionally, while the above description has been made with respect to detecting the rotation of nonmetallic objects past a fixed structure, the system may be utilized to detect clearances between rotating metallic structures in addition to those discussed previously with respect to the use of alterations to electric and magnetic fields.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for measuring clearances between a rotating structure within a fixed surrounding structure, comprising:
   a position detector for determining when at least one portion of the rotating structure rotates past a hole defined in the fixed surrounding structure and generating an actuation signal responsive to rotation of the at least one portion of the rotating structure past the hole defined in the fixed surrounding structure; and
   white light interferometer circuitry, initiated responsive to the actuation signal, for reflecting a white light beam off of at least one portion of the rotating structure to determine a clearance between the at least one portion of the rotating structure and an inner surface of the fixed surrounding structure, wherein the actuation signal actuates the white light interferometer circuitry to reflect the white light beam off of the at least one portion of the rotating structure through the hole defined in the fixed surrounding structure.

2. The apparatus of claim 1 further comprising a processor for determining changes in the clearance between the at least one portion of the rotating structure and the fixed surrounding structure responsive to the clearance determined by the white light interferometer circuitry and a clearance determined when the rotating structure is not moving.

3. The apparatus of claim 1, wherein the position detector further comprises:
   a reflector mounted on the rotating structure;
   a laser for projecting a laser beam toward the rotating structure in a fixed position;
   a detector for detecting a reflection of the laser beam from the reflector when the reflector reflects the laser beam responsive to rotation of the reflector past the fixed position of the laser beam; and
   a controller for determining when the at least one portion of the rotating structure rotates past the hole defined in the fixed surrounding structure responsive to the detected reflection of the laser beam and generating the actuation signal responsive to the determination.

4. The apparatus of claim 1, wherein the white light interferometer circuitry further comprises:
   a white light emitter for generating a white light beam responsive to the actuation signal from the position detector;
   a beam splitter for receiving the white light beam and generating a reference beam and a measurement beam responsive thereto;
   a high-speed camera for comparing the reference beam and the measurement beam to determine the clearance between the at least one portion of the rotating structure and the inner surface of the fixed surrounding structure; and
   wherein the reference beam is reflected by the beam splitter to the high-speed camera and the measurement beam is reflected by the beam splitter to the hole in the fixed surrounding structure and the at least one portion of the rotating structure reflects the measurement beam back to the beam splitter which reflects the measurement beam to the high-speed camera.

5. The apparatus of claim 1, wherein the white light beam is projected perpendicular to an axis of rotation of the rotating structure.

6. The apparatus of claim 1, wherein the white light beam is projected parallel to an axis of rotation of the rotating structure.

7. The apparatus of claim 1, wherein the rotating structure comprises a fan and further wherein the at least one portion of the rotating structure comprises a blade tip of a fan blade of the fan.

8. An apparatus, comprising:
   a fan having a plurality of blades made of a non-metallic structure rotating about a rotation axis of the fan;
   a fixed structure surrounding the fan and having an inner surface separated from the blades by a clearance;
   a position detector for determining when a tip of a blade of the fan rotates past a hole defined in the fixed structure and generating an actuation signal responsive to rotation of the tip of the blade of the fan past the hole defined in the fixed structure; and
   white light interferometer circuitry, initiated responsive to the actuation signal, for reflecting a white light beam off of the tip of the blade of the fan to determine the clearance between the tip of the blade of the fan and the inner surface of the fixed structure, wherein the actuation signal actuates the white light interferometer circuitry to reflect the white light beam off of the tip of the blade of the fan through the hole defined in the fixed structure.

9. The apparatus of claim 8 further comprising a processor for determining changes in the clearance between the tip of the blade of the fan and the fixed structure responsive to the clearance determined by the white light interferometer circuitry and a clearance determined when the fan is not moving.

10. The apparatus of claim 8, wherein the position detector further comprises:
a reflector mounted on the fan;
a laser for projecting a laser beam toward the fan in a fixed position;
a detector for detecting a reflection of the laser beam from the reflector when the reflector reflects the laser beam responsive to rotation of the reflector past the fixed position of the laser beam; and
a controller for determining when the tip of the blade of the fan rotates past the hole defined in the fixed surrounding structure responsive to the detected reflection of the laser beam and generating the actuation signal responsive to the determination.

11. The apparatus of claim 8, wherein the white light interferometer circuitry further comprises:
a white light emitter for generating a white light beam responsive to the actuation signal from the position detector;
a beam splitter for receiving the white light beam and generating a reference beam and a measurement beam responsive thereto;
a high-speed camera for comparing the reference beam and the measurement beam to determine the clearance between the tip of the blade of the fan and the inner surface of the fixed structure; and
wherein the reference beam is reflected by the beam splitter to the high-speed camera and the measurement beam is reflected by the beam splitter to the hole in the fixed structure and the tip of the blade of the fan reflects the measurement beam back to the beam splitter which reflects the measurement beam to the high-speed camera.

12. The apparatus of claim 8, wherein the white light beam is projected perpendicular to an axis of rotation of the fan.

13. The apparatus of claim 8, wherein the white light beam is projected parallel to an axis of rotation of the fan.

14. A method for measuring clearances between a rotating structure within a fixed surrounding structure, comprising:
determining when at least one portion of the rotating structure rotates past a hole defined in the fixed surrounding structure using a position detector;
generating an actuation signal responsive to rotation of the at least one portion of the rotating structure past the hole defined in the fixed surrounding structure using the position detector;
reflecting a white light beam off of at least one portion of the rotating structure through the hole defined in the fixed surrounding structure using white light interferometer circuitry responsive to the actuation signal; and
determining a clearance between the at least one portion of the rotating structure and an inner surface of the fixed surrounding structure using the white light interferometer circuitry.

15. The method of claim 14 further comprising determining changes in the clearance between the at least one portion of the rotating structure and the fixed surrounding structure responsive to the clearance determined by the white light interferometer circuitry and a clearance determined when the rotating structure is not moving using a processor.

16. The method of claim 14, wherein the step of determining further comprises:
projecting a laser beam from a laser toward the rotating structure in a fixed position;
reflecting the laser beam back using a reflector mounted on the rotating structure;
detecting using a detector a reflection of the laser beam from the reflector when the reflector reflects the laser beam responsive to rotation of the reflector past the fixed position of the laser beam; and
determining using a controller when the at least one portion of the rotating structure rotates past the hole defined in the fixed surrounding structure responsive to the detected reflection of the laser beam.

17. The method of claim 16, wherein the step of generating further comprises generating the actuation signal responsive to the determination.

18. The method of claim 14, wherein the step of reflecting further comprises:
generating a white light beam using a white light emitter responsive to the actuation signal from the position detector;
receiving the white light beam at a beam splitter; and
generating a reference beam and a measurement beam responsive to the received white light beam.

19. The method of claim 18, wherein the step of determining the clearance further comprises comparing using a high-speed camera the reference beam and the measurement beam to determine the clearance between the at least one portion of the rotating structure and the inner surface of the fixed surrounding structure.

20. The method of claim 18, wherein the step of generating the reference beam and the measurement beam further comprises:
splitting the white light beam into the reference beam and the measurement beam at the beam splitter;
reflecting the reference beam by the beam splitter to a high-speed camera;
reflecting the measurement beam to the hole in the fixed surrounding structure;
reflecting the measurement beam from the at least one portion of the rotating structure back to the beam splitter; and
reflecting the measurement beam to the high-speed camera.

* * * * *